(12) United States Patent
Morovic et al.

(10) Patent No.: US 10,623,606 B2
(45) Date of Patent: Apr. 14, 2020

(54) LINEARIZING PRINT OUTPUTS FOR A PRINTING SYSTEM

(71) Applicant: HEWLETT-PACKARD DEVELOPMENT COMPANY, L.P., Spring, TX (US)

(72) Inventors: Peter Morovic, Sant Cugat del Valles (ES); Jan Morovic, London (GB)

(73) Assignee: Hewlett-Packard Development Company, L.P., Spring City, TX (US)

( * ) Notice: Subject to any disclaimer, the term of this patent is extended or adjusted under 35 U.S.C. 154(b) by 0 days.

(21) Appl. No.: 16/339,303

(22) PCT Filed: Feb. 15, 2017

(86) PCT No.: PCT/US2017/017926
§ 371 (c)(1),
(2) Date: Apr. 3, 2019

(87) PCT Pub. No.: WO2018/151719
PCT Pub. Date: Aug. 23, 2018

(65) Prior Publication Data
US 2020/0045207 A1    Feb. 6, 2020

(51) Int. Cl.
*H04N 1/60* (2006.01)
*G06F 3/12* (2006.01)

(52) U.S. Cl.
CPC ......... *H04N 1/6027* (2013.01); *G06F 3/1208* (2013.01); *H04N 1/6008* (2013.01); *H04N 1/6019* (2013.01); *H04N 1/6033* (2013.01)

(58) Field of Classification Search
None
See application file for complete search history.

(56) References Cited

U.S. PATENT DOCUMENTS

| | | | |
|---|---|---|---|
| 5,185,661 A | 2/1993 | Ng | |
| 5,710,824 A | 1/1998 | Mongeon | |
| 6,178,008 B1 * | 1/2001 | Bockman | G06K 15/102 358/1.1 |
| 7,050,200 B2 | 5/2006 | Sanger | |
| 7,706,036 B2 | 4/2010 | Yoshida et al. | |
| 8,305,641 B2 | 11/2012 | Sawada et al. | |

(Continued)

OTHER PUBLICATIONS

Chang, J.Z.; "Modeling a CMYK Printer as an RGB Printer"; Jan. 19, 2002; http://proceedings.spiedigitallibrary.org/proceeding.aspx?articleid=876394.

*Primary Examiner* — Anh-Vinh T Nguyen
(74) *Attorney, Agent, or Firm* — HP Inc. Patent Department

(57) ABSTRACT

An example method of linearizing print outputs for a printing system is described. The method involves retrieving a look-up table comprising a plurality of nodes that map input space values to Neugebauer Primary Area Coverage vectors. The printing system is used to print a set of ramps, each ramp comprising a plurality of test areas. The test areas for each ramp are defined by varying vector element values corresponding to input space values that vary in a dimension of the input space. A property of each of the printed test areas is measured and a linearization function is determined based on those measured properties. The linearization function is then applied to the input space values for the plurality of nodes in the look-up table.

15 Claims, 10 Drawing Sheets

(56) References Cited

U.S. PATENT DOCUMENTS

| | | |
|---|---|---|
| 8,335,015 B2 | 12/2012 | Klassen |
| 8,610,959 B2 | 12/2013 | Wang et al. |
| 2006/0061777 A1* | 3/2006 | Duggan ............. H04N 1/00355 358/1.1 |
| 2010/0214576 A1 | 8/2010 | Morovic |
| 2014/0071173 A1* | 3/2014 | Bastani ................ G02B 26/001 345/690 |
| 2015/0156369 A1* | 6/2015 | Reed .................. H04N 1/32309 382/100 |
| 2015/0281523 A1 | 10/2015 | Higgins |
| 2017/0013174 A1* | 1/2017 | Morovic ............. H04N 1/6055 |
| 2018/0097527 A1* | 4/2018 | Boyd ................... H04N 19/103 |
| 2018/0264733 A1* | 9/2018 | Morovic .............. B29C 64/386 |
| 2019/0037109 A1* | 1/2019 | Morovic ........... H04N 1/00023 |
| 2019/0089867 A1* | 3/2019 | Morovic ........... H04N 1/00023 |
| 2019/0281191 A1* | 9/2019 | Morovic .................... B41J 2/21 |
| 2019/0349498 A1* | 11/2019 | Bai ......................... H04N 1/60 |
| 2019/0350680 A1* | 11/2019 | Chekh ..................... G06T 19/20 |

* cited by examiner

300

310 — Retrieve a look-up table comprising a plurality of nodes that map input color space values to Neugebauer Primary Area Coverage (NPAC) vectors 320 — Print a set of ramps, each ramp comprising a plurality of test regions, wherein the test regions for each ramp are defined by varying vector element values corresponding to input color space values that vary in one dimension 330 — Measure a property of each of the printed test areas 340 — Determine a linearization function on the basis of the measured properties of the printed test areas 350 — Apply the linearization function to the input color space values for the plurality of nodes in the look-up table

410 — Determine a range of L* values from the measured test areas and subdivide the range of L* values into N steps 420 — Interpolate regular L* steps in the original input color space data to generate a new set of input color space data values

*Fig. 4*

LINEARIZING PRINT OUTPUTS FOR A PRINTING SYSTEM

BACKGROUND

Printing systems may be arranged to produce an image (in two or three dimensions—2D or 3D) based on input data. In certain printing systems, color data for the image may be represented in a first color space. For example, color data for the image may be represented in a Red, Green, Blue (RGB) color space. In practical terms, use of a particular color space may set how the color data for the image is defined, stored and processed within a printing system.

BRIEF DESCRIPTION OF THE DRAWINGS

Various features of the present disclosure will be apparent from the detailed description which follows, taken in conjunction with the accompanying drawings, which together illustrate, by way of example only, features of the present disclosure, and wherein:

FIG. 3 is a flow diagram showing a method of linearizing print outputs for a printing system according to an example;

FIG. 4 is a flow diagram showing a method of linearizing print outputs for a printing system according to an example;

DETAILED DESCRIPTION

Figure 1:
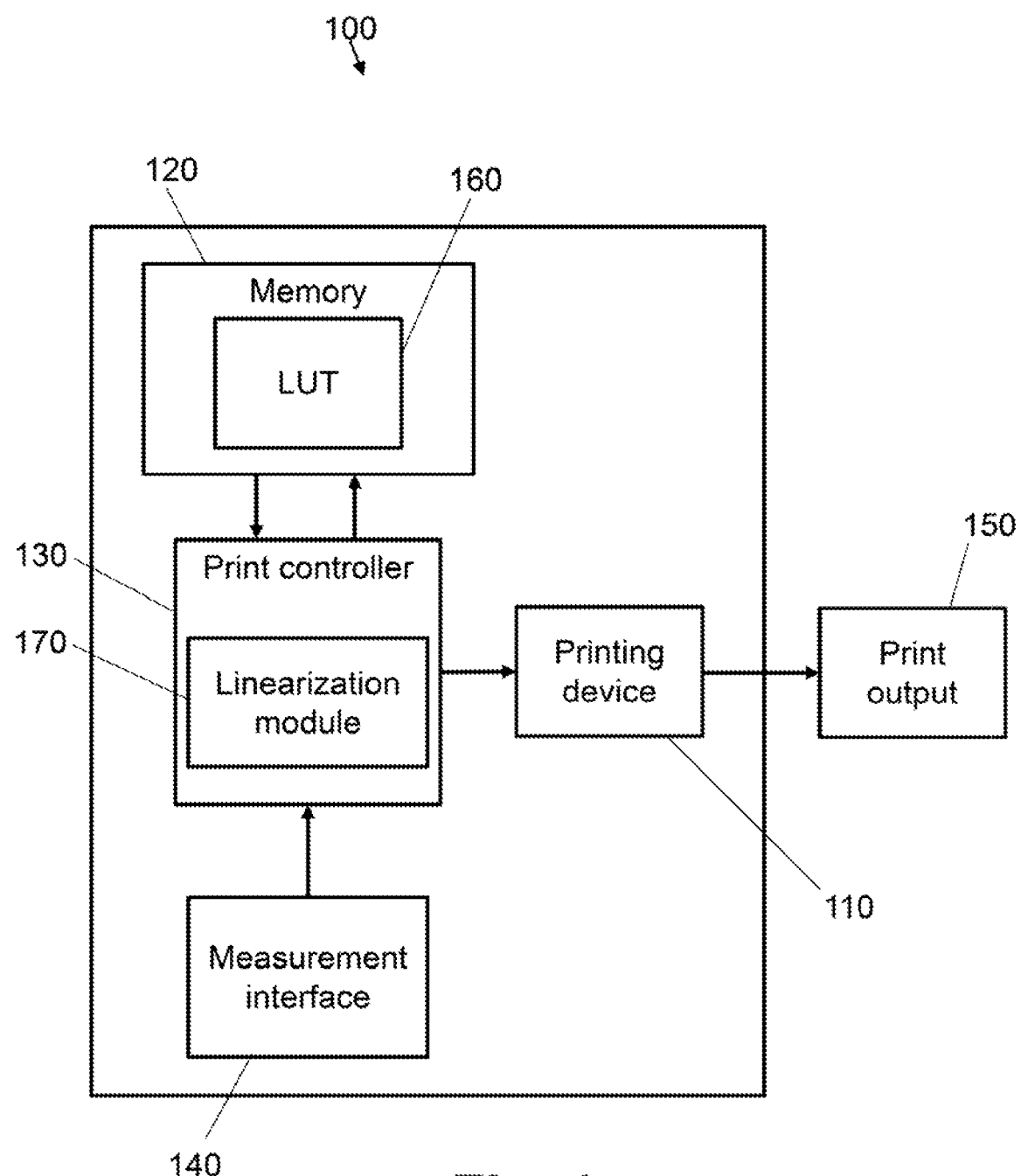
FIG. 1 is a schematic diagram showing a printing system according to an example.

In the following description, for purposes of explanation, numerous specific details of certain examples are set forth. Reference in the specification to "an example" or similar language means that a particular feature, structure, or characteristic described in connection with the example is included in at least that one example, but not necessarily in other examples.

A printing system may have a limited number of output channels, such as available colorants. As such, color data may be mapped from a first color space, e.g. within which color data for an image is digitally defined in one or more dimensions, to a second color space, defined by the available output channels, that is used to produce the output. Area coverage representations, such as Neugebauer Primary area coverages for example, may be used to implement this second color space. A color mapping may be used to map color data as defined within a print job to the second color space.

Certain examples described herein relate to color calibration of a printing system. Color calibration may, for example, be used to adjust the color response of the printing system to more accurately correspond to a desired color to be printed. Color calibration may be used to calibrate a color mapping process by which a first representation of a given color is mapped to a second representation of the same color. Although "color" is a concept that is understood intuitively by human beings, it can be represented within print and display devices in a large variety of ways. For example, in one case, a color as observed visually by an observer is defined with reference to a power or intensity spectrum of electromagnetic radiation across a range of visible wavelengths. In other cases, a color model is used to represent a color at a lower dimensionality. For example, certain color models make use of the fact that color may be seen as a subjective phenomenon, i.e. dependent on the make-up of the human eye and brain. In this case, a "color" may be defined as a category that is used to denote similar visual perceptions; two colors are said to be similar if they produce a similar effect on a group of one or more people. These categories can then be modelled using a lower number of variables.

Within this context, a color model may define a color space. A color space in this sense may be defined as a multi-dimensional space, with a point in the multi-dimensional space representing a color value and dimensions of the space representing variables within the color model. For example, in a Red, Green, Blue (RGB) color space, an additive color model defines three variables representing different quantities of red, green and blue light. In a digital model, values for these quantities may be defined with reference to a quantized set of values. For example, a color defined using an 8-bit RGB model may have three values stored in a memory, wherein each variable may be assigned a value between 0 and 255. Other color spaces include: a Cyan, Magenta, Yellow and Black (CMYK) color space, in which four variables are used in a subtractive color model to represent different quantities of colorant or printing fluid, e.g. for a printing system; the International Commission on Illumination (CIE) 1931 XYZ color space, in which three variables ('X', 'Y' and 'Z' or tristimulus values) are used to model a color; the CIE 1976 (L*, a*, b*—CIELAB or 'LAB') color space, in which three variables represent lightness ('L') and opposing color dimensions ('a' and 'b'); and the Yu'v' color space, in which three variables represent the luminance ('Y') and two chrominance dimensions (u' and v').

Other color spaces include area coverage spaces, such as the Neugebauer Primary area coverage (NPac) color space. An NPac vector in the NPac color space represents a statistical distribution of one or more Neugebauer Primary vectors over an area of a halftone. In a simple binary (bi-level, i.e. two drop states: "drop" or "no drop") printer, a Neugebauer Primary is one of $2^k$ combinations of k printing fluids within the printing system. For example, if a printing device uses CMY printing fluids there can be eight Neugebauer Primaries. These Neugebauer Primaries relate to the following: C, M, Y, C+M, C+Y, M+Y, C+M+Y, and W (white or blank indicating an absence of printing fluid). As may be seen, a Neugebauer Primary may comprise an overprint of two available printing fluids, such as a drop of Magenta on a drop of Cyan (for a bi-level printer) in a common addressable print area (e.g. a printable "pixel"). Other examples may also incorporate multi-level printers, e.g. where print heads are able to deposit N drop levels; in this case an Neugebauer Primary may include one of $N^k$ combinations of k printing fluids within the printing system. An NPac space provides a large number of metamers. Metamerism is the existence of a multitude of combinations of reflectance and emission properties that result in the same perceived color for a fixed illuminant and observer.

Each NPac vector may therefore define the probability distribution for one or more colorant or printing fluid combinations for each pixel in the halftone (e.g. a likelihood that a particular colorant or printing fluid combination is to be placed at each pixel location in the halftone). In this manner, a given NPac vector defines a set of halftone parameters that can be used in the halftoning process to map a color to one or more NPac vectors to be statistically distributed over the plurality of pixels for a halftone. Moreover, the statistical distribution of Neugebauer Primaries to pixels in the halftone serves to control the colorimetry and other print characteristics of the halftone.

Spatial distribution of the Neugebauer Primaries according to the probability distribution specified in the NPac vector may be performed using any suitable halftoning methods as is known in the art. In this respect, examples of suitable halftoning methods include matrix-selector-based Parallel Random Area Weighted Area Coverage Selection (PARAWACS) techniques and techniques based on error diffusion. An example of a printing system that uses area coverage representations for halftone generation is a Halftone Area Neugebauer Separation (HANS) pipeline.

Examples described herein relate to color calibration for printing based on NPacs, for example using a HANS pipeline. The color calibration may involve calibration of a color mapping from a device-dependent color space such as RGB or CMYK, for which a given color value may have a different perceived color when printed by different printing systems, to an NPac color space. Such examples will be described further below.

Printing systems may be configured to favor particular print attributes. For example, the print attributes may relate to, amongst others, color constancy, efficient use of output elements, robustness, and metamerism under a set of conditions. The use of area coverage representations enables one metamer, i.e. an output color value in an output color space, to be selected from a set of metamers to modify, e.g. optimize, one or more of these printing attributes. In one case, a particular output color value in the form of a NPac vector may be selected from a set of NPac vectors that map to a common input color value. For example, an area coverage representation in the form of an NPac vector may be selected to minimize a change in observed color of an image output when subject to variations in the printing system, i.e. on a basis of increased robustness. Area coverage representations may have a dimensionality defined by the number of available output elements (n) and a number of addressable states of each output element (k). In particular, there may be $k^n$ dimensions. For example, if a printing system uses four colorants (e.g. CMYK) wherein each colorant may be deposited at one of three levels, an area coverage representation space may have $3^4=81$ dimensions. This may be contrasted with the n or four dimensions of a comparative colorant space and the three dimensions of an input tristimulus color space (such as a RGB or Commission Internationale de l'Éclairage (CIE) XYZ based color space).

In some examples, linear variation in the output color value, for example in an NPac domain, may not correspond to perceptually uniform variation in a printed image. Perceptually uniform means that a change of the same amount in a color value should produce a change of about the same visual importance. For example, equal intervals of area coverage may not equate to visually equidistant intervals in a printed output.

FIG. 1 shows an example printing system 100. Certain examples described herein may be implemented within the context of this printing system.

In the example of FIG. 1, the printing system comprises a printing device 110, a memory 120, a print controller 130, and a measurement interface 140.

The printing device 110 is to print a plurality of colorants to a print substrate to produce a print output 150. The print output 150 may, for example, comprise colored printing fluids deposited on a substrate. The printing device 110 may comprise an inkjet deposit mechanism.

In 2D printing systems, the substrate may be paper, fabric, plastic or any other suitable print medium.

In 3D printing systems, the printed output may be a 3D printed object. In such systems, the substrate may be a build material in the form of a powder bed comprising, for example, plastic, metallic, or ceramic particles. Chemical agents, referred to herein as "printing agents", may be selectively deposited onto a layer of build material. In one case, the printing agents may comprise a fusing agent and a detailing agent. In this case, the fusing agent is selectively applied to a layer in areas where particles of the build material are to fuse together, and the detailing agent is selectively applied where the fusing action is to be reduced or amplified. In some examples, colorants may be deposited on a white or blank powder to color the powder. In other examples, objects may be constructed from layers of fused colored powder.

The memory 120 comprises a look up table (LUT) 160. The LUT 160 may include, for example, a plurality of nodes that map input color space values to NPac vectors. A "node", as used herein, refers to an entry in the LUT 160, which may be represented as a row with an input color space value and an associated NPac vector value (e.g. an RGB value to NPac array). This row may be stored as an entry in an array in a memory, e.g. in the form of a tuple of data values. A mapping for input color values that do not have matching nodes in the LUT 160 may be implemented by interpolating values between nodes.

The print controller 130 receives test data 160 from the memory 120. In certain examples, the test data 160 may comprise color data as represented in the input color space, such as pixel representations in an RGB color space. The input color space may be device-dependent or colorimetric. The print controller 130 maps the color data from the input color space to the output color space for use by the printing device 110 to generate the print output 150. In the present example, the color mapping takes the form of the LUT 160. In certain cases, input in a device-dependent color space may be first mapped to a colorimetric color space, before being mapped to NPac space. The output color space may be device-dependent. Certain examples described below provide a configuration, e.g. in certain cases an optimization, of such a color mapping.

The measurement interface 140 is to receive indication of a measured property of printed test areas. The measurement interface 140 may transmit information regarding indicated test areas to the print controller 130. The print controller 130 may store information regarding indicated test areas in the memory 120. In some examples, the print controller 130 may, as described below, modify the color mapping based on the indicated test areas.

In some examples, the print controller 130 may comprise a linearization module 170 arranged to modify the LUT 160 stored in the memory 120. In other examples, the print controller 130 may store, in the linearization module, data representing a linearization function for converting values in the LUT 160 to linearized values (i.e. that result in perceptually uniform printed output) in the memory 120 to be applied during a subsequent print operation. The linearization function may, for example, define parameters for a mathematical equation as defined within computer program code which are determined and stored. The linearization function may be applied by processing the computer program code with the stored parameters.

In certain examples, the measurement interface 140 is configured to receive input from a color measurement device, such as, amongst others, a tristimulus colorimeter, a spectrocolonmeter or a spectrophotometer. The output from such a device may be in a desired color space or may be converted to the desired space using conversion equations in the art. In other examples, the measurement interface 140 may retrieve color measurements from a memory, such as memory 120 or another coupled storage device or from a user interface.

Figure 2:
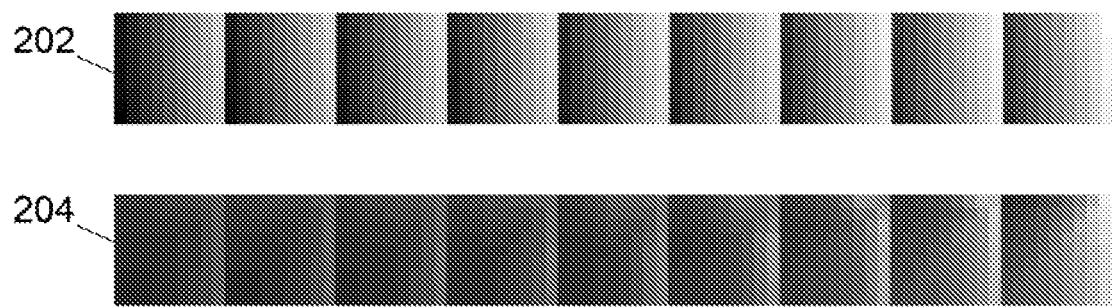
FIG. 2 is a grayscale representation of a set of color ramps according to an example.

FIG. 2 is a plot showing grayscale representation of a series of test areas in their native, linear input color space (top row 202) and the corresponding resulting print outputs (bottom row 204), as measured using an LAB colorimetry measurement. The test areas comprise 9 blocks of 9×9 tests areas in which color is varied. In the example shown in FIG. 2, the 9 blocks of 9×9 test areas represent a sampling of RGB color space in which Red (R), Green (G), and Blue (B) color space variables are varied between one another and also from black to white (i.e. along the neutral color space axis).

As can be seen in FIG. 2, despite the test areas varying uniformly (i.e. linearly) in the input color space, there is a clear non-uniformity in the resulting printed output. That is, as compared to the input space values, the resulting printed outputs appear disproportionately darkened towards the lower left hand corner of each block.

In order to mitigate such non-uniformity, perceptually linear output values may be created by building a look-up table (LUT) and one or more linearization functions (e.g. linearization curves) may be computed and used to convert an original LUT into a linearized LUT in which a printed output results in color variation that perceptively varies uniformly.

FIG. 3 is a flow diagram showing a method 300 of linearizing print outputs for a printing system, such as the printing system described above with reference to FIG. 1.

At block 310, a look-up table (LUT) comprising a plurality of nodes that map input space values to Neugebauer Primary Area Coverage (NPAC) vectors is retrieved. For example, the LUT may be retrieved from the memory 120.

At block 320, a set of ramps are printed. Each ramp comprises a plurality of test areas, where the test areas for each ramp are defined by varying vector element values corresponding to input space values that vary in one dimension of the input space.

At block 330, a property of each of the printed test areas is measured. For example, one or more colorimetry measurements may be made on each of the printed test areas to determine one or more values defining the color of the printed test areas. For example, LAB measurements may be made on each test area and values, L*, defining the lightness of each test area may be measured. In other examples, the measured property may be a color difference between a measured color of a respective test areas and a white level (e.g. a color of an unprinted substrate). For example, the difference in color may be computed using a color difference equation such as CIE76 or CIE2000.

Referring to FIG. 2, LAB measurements, for example, may be made for each of the ramps of test areas of the bottom row 204 of blocks.

At block 340, a linearization function may be determined on the basis of the measured properties of the printed test areas.

At block 350, the linearization function may be applied to the input color space values for the plurality of nodes in the look-up table. For example, the LUT 160 stored in the memory 120 may be modified to map desired output color space values with input color space values determined by the linearization function (rather that the input color space values used to print the test areas). Alternatively, a representation of the linearization functions may be stored in the memory and subsequently used to convert the LUT 160 in a later print operation.

FIG. 4 is a flow diagram showing a method 400 of determining a linearization function (block 340) for each ramp in a set of test areas.

At block 410, a range of L* values is determined (i.e. based on the maximum value of L*) and the range of L* values is subdivided into a number (N) of intervals. The intervals may be substantially even intervals. In some examples, N may correspond to number of test areas in the ramp (e.g. 9 in the example shown in FIG. 2).

At block 420, regular L* intervals are interpolated in the original input space data used to define the printed ramps of test areas to generate a new set of input space values. The result is a new set of input space values which, if mapped to the output space and printed would result in uniformly varying values of L*.

Figure 5:
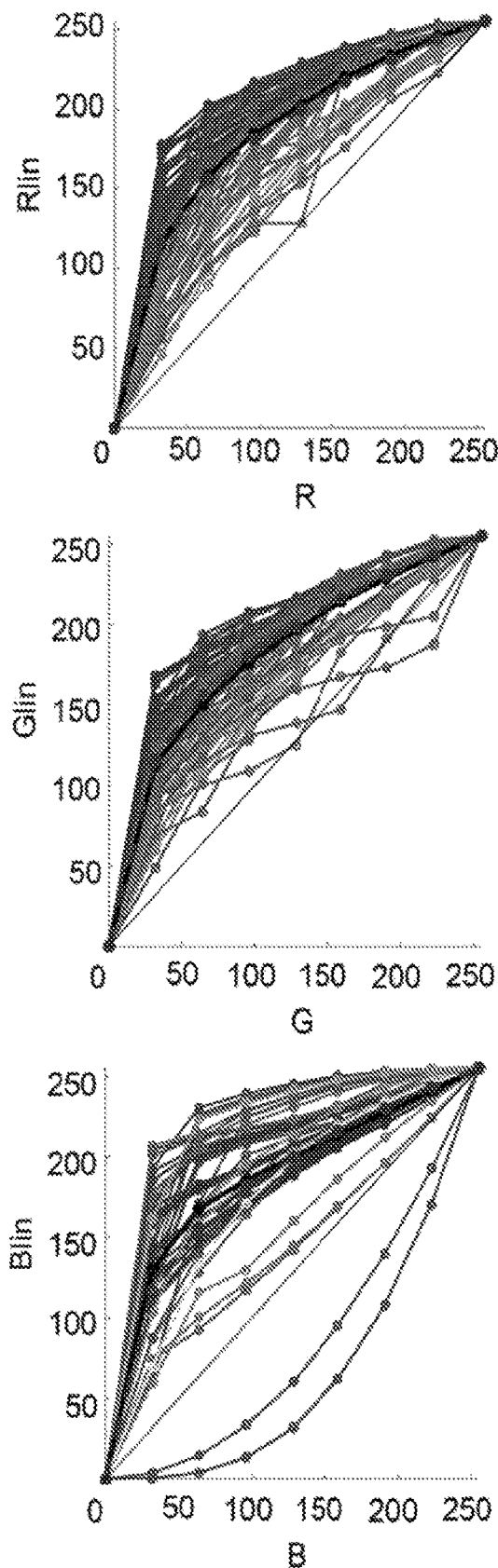
FIG. 5 shows graphs of linearized RGB values plotted against unlinearized RGB values according to an example.

FIG. 5 shows graphs of linearized RGB values plotted against unlinearized RGB values for the ramps shown in FIG. 2, for each of the R, G, and B input color space channels. R, G and B plotted on the x-axes represent the respective original R, G and B input color space values, and Rlin, Glin, and Blin on the y-axes represent the linearized R, G, and B input color space values i.e. those that if printed would result in a perceptually uniform variation in accordance with the uniform variation in the original input color space values.

In some examples, for each of the R, G, B input color space values, an average linearization curve may be calculated based on the data plotted in each of the graphs shown in FIG. 5, to generate three one-dimensional (1D) linearization functions, i.e. one per channel of the input color space. These per-channel linearization functions may be used to separately linearize (i.e. make perceptually uniform) the separate input color space channels.

In some examples, an average linearization over all input color space channels (i.e. averaged over R, G, and B) may be calculated based on the data plotted in all of the graphs shown in FIG. 5. This provides a single 1D linearization that can be applied to all of the input color space channels. In some examples, a single linearization may be used instead of per-channel linearizations so that neutrality (i.e. variation from black to white) is the same for all input color space channels.

In some examples, a curve fit may be used to interpolate between the measured data points of the per-channel average linearization functions and/or the average linearization over all input color space channels.

Figure 6:
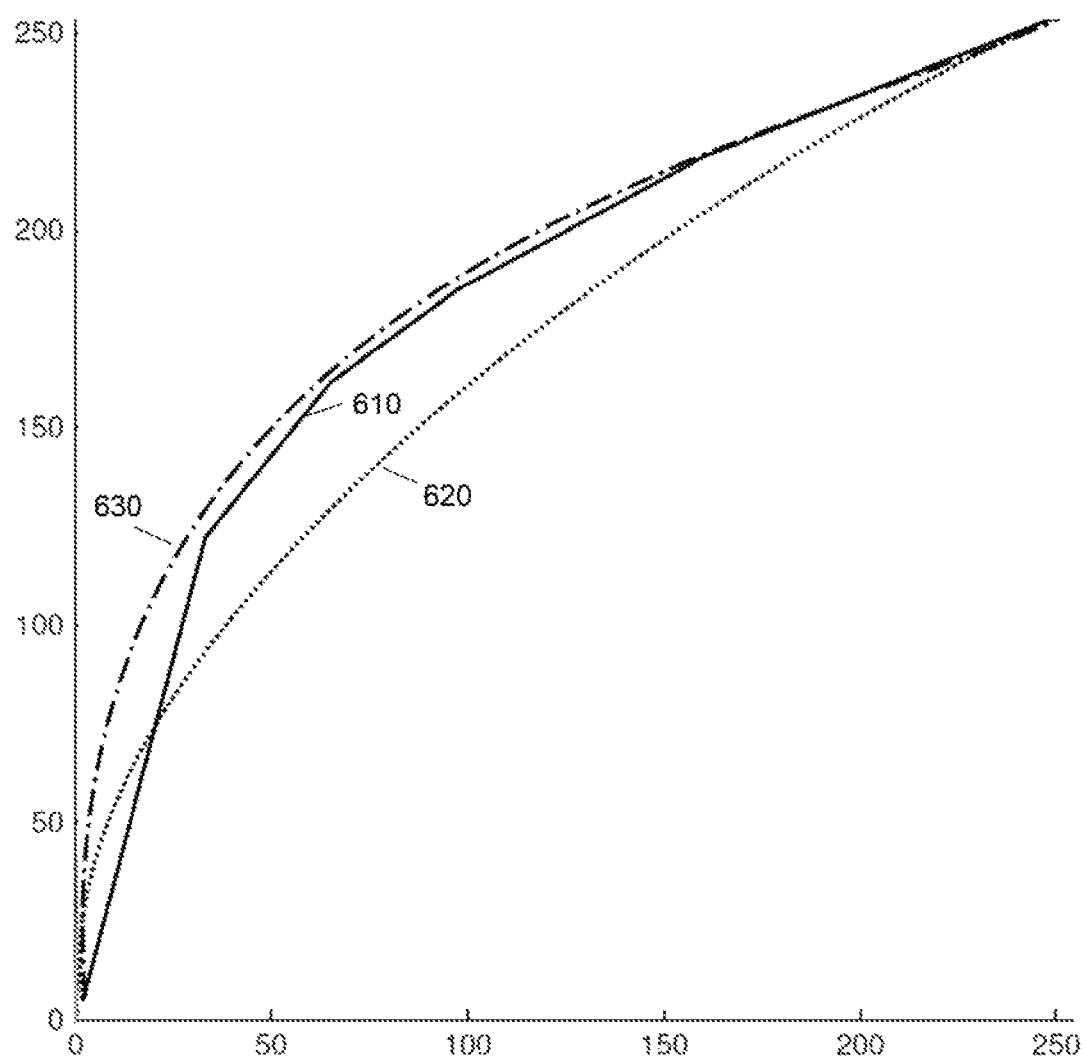
FIG. 6 is a plot of linearization functions according to an example.

FIG. 6 is a plot showing examples of interpolation curves for average linearization data over all input color space channels as illustrated by solid line 610. In some examples, a cubic interpolation may be used, e.g. as illustrated by dashed line 620. In some examples, a square-root interpolation (gamma correction) may be used, e.g. as illustrated by the dot-dash line 630. In other examples, other suitable interpolation functions may be used.

The linearization may be applied to the original LUT 160 (block 350) by taking the linearization function described above (for example, the average linearization over all input color space channels, or an interpolated curve fit of that function) and applying the linearization function to the original input color space values by interpolation. For example, the interpolation may comprise pairing unlinearized LUT values with corresponding linearized LUT values.

In some examples, an unknown linearized LUT value may be interpolated by linear interpolation by identifying known linearized LUT values below and above the unknown value and computing the unknown value by a weighted combination of the two known LUT values. In other examples, the interpolation may be non-linear. For example, an unknown LUT value could be determined using a non-linear function such as a curve fit to interpolate values between the known LUT values. In some examples, a polynomial curve fit may be used to interpolate unknown LUT values. In another example, cubic splines using piece-wise non-linear curves may be used to interpolate unknown LUT values.

Figure 7:
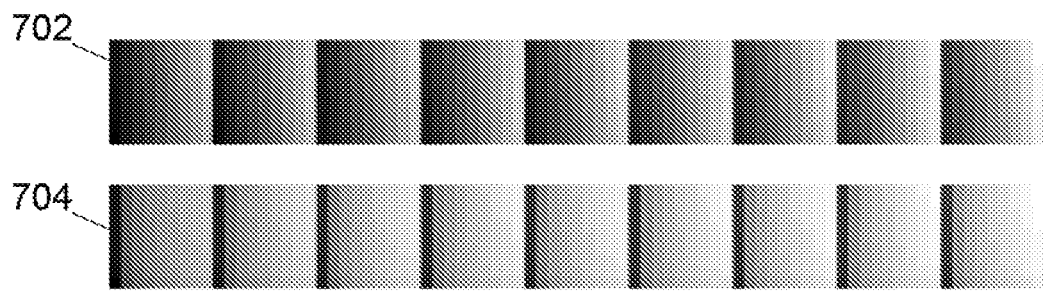
FIG. 7 is a grayscale representation of a linearized input space values according to an example.

FIG. 7 is a plot showing a grayscale representation of a series of test areas in their native input color space (the top row 702 corresponds to top row 202 of FIG. 2) and a linearized version of the input color space (bottom row 704), which if printed would result in perceptually uniformly varying values of L*, as measured using an LAB colorimetry measurement.

Figure 8:
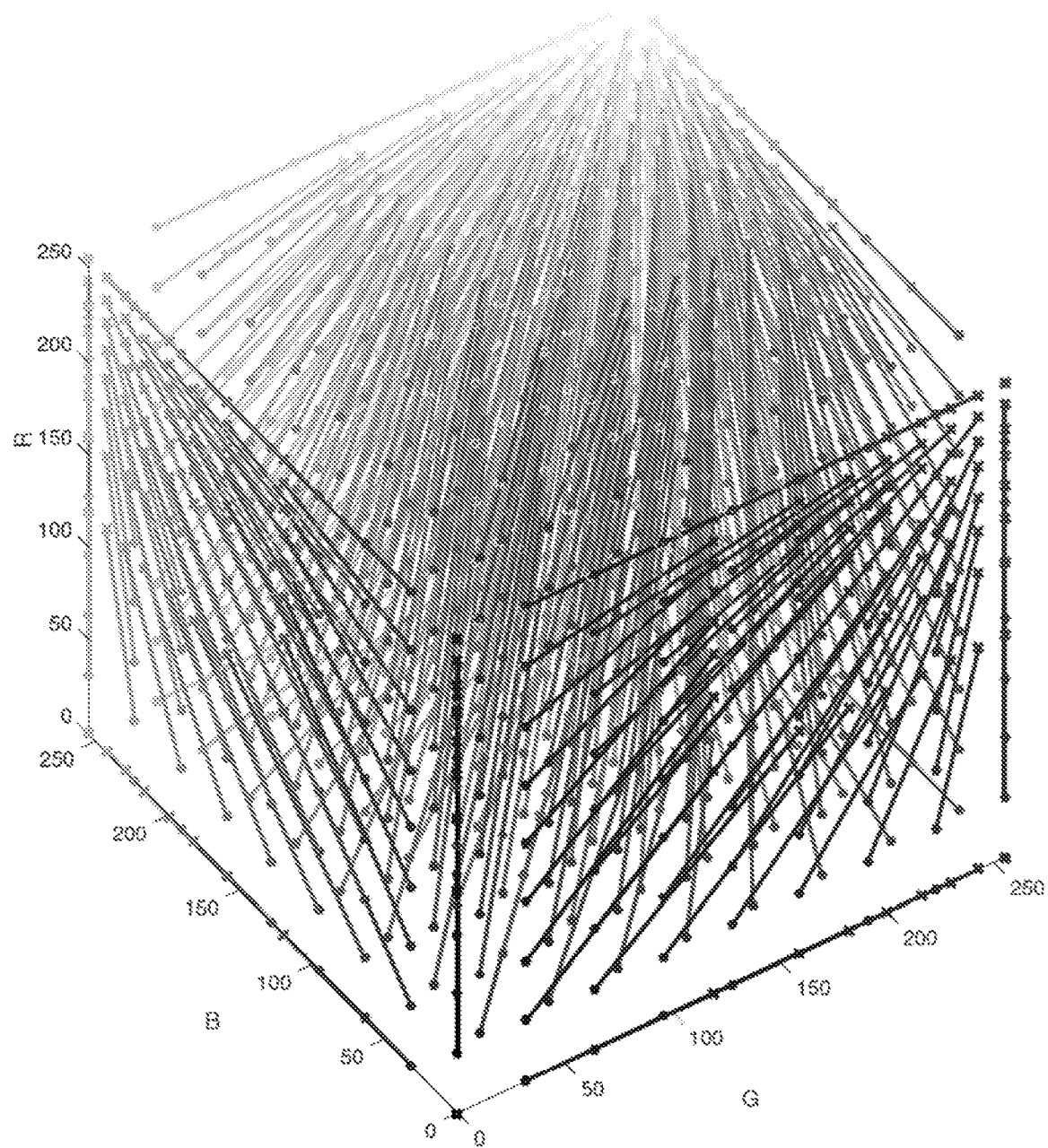
FIG. 8 is a grayscale representation of the effect of applying a linearization function according to an example.

FIG. 8 is a three-dimensional graph illustrating the transformation of original values in an RGB input color space (represented by circles) to a linearized RGB input color space (represented by crosses). In FIG. 8, unlinearized values in the RGB input color space are mapped to linearized values in the RGB input color space. That is, input color space values are mapped to a value that is distinct in the RGB space (i.e. by a length of an RGB vector between the RGB input color space value and the linearized input color space value). In the R-B plane of the RGB space, generally input space color values are mapped from lower values of R and B to higher values of R and B. Similarly, In the R-G plane of the RGB space, generally input space color values are mapped from lower values of R and G to higher values of R and G. Moreover, within the volume of the RGB space, generally input space color values are mapped from lower RGB values towards a white point (i.e, where R, G, and B are at their maximum values). In accordance with what is expected from the linearization curves described above, changes in values from the original RGB input color space to the linearized RGB input color space get progressively smaller towards the lighter tones, with larger changes in the darker tones.

Although, in the example described above with reference to FIG. 2, a full sampling of the input color space is depicted, it will be understood that in some examples, a simpler set of test areas may be printed and used to determine the linearization functions based on which the LUT may be linearized.

Figure 9:
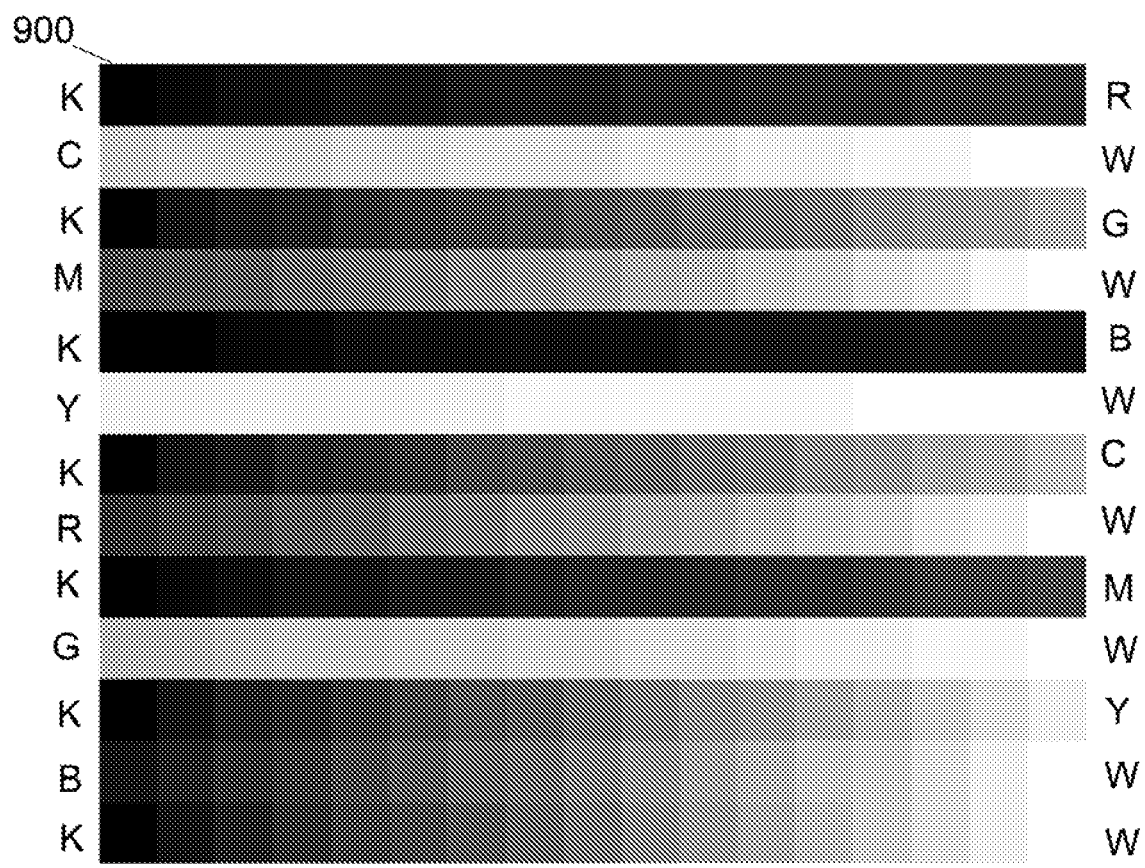
FIG. 9 is a grayscale representation of a set of color ramps according to an example.

FIG. 9 is a grayscale representation of an example of a simplified set of test areas 900 which may be printed and measured according to the method 300 described above with reference to FIG. 3.

In the set of test areas 900 depicted in FIG. 9, a set of ramps is defined for printing, in which each of the Neugebauer primaries (i.e. Red (R), Green (G), Blue (B), Cyan (C), Magenta, (M) and Yellow (Y)) is printed from 100% of the Neugebauer primary to 100% black (K) and from 100% of the Neugebauer primary to 100% white (W), as well as from 100% black (K) to 100% white (W) (i.e. the neutral axis of the color space).

In some examples, the interpolation used to convert the original values in the input color space to the linearized input color space may be a linear interpolation. In such examples, conversion between the original input color space and the linearized input color space is invertible. In other example, non-linear functional approximations may be used to convert the original values in the input color space to the linearized input color space.

Conversion between original values in the input color space and the linearized input color space may allow for the introduction of additional nodes to the LUT 160. For example, where additional nodes are from an already linearized LUT, those nodes may be added without any conversion. However, in examples where the additional nodes are from an unlinearized LUT, the LUT 160 can be converted into its original unlinearized domain, to generate a delinearized LUT. The additional nodes can be then added to the delinearized LUT and the original nodes and the additional nodes (to generate an augmented LUT) can both be linearized using the method 300 described above with reference to FIG. 3.

Figure 10:
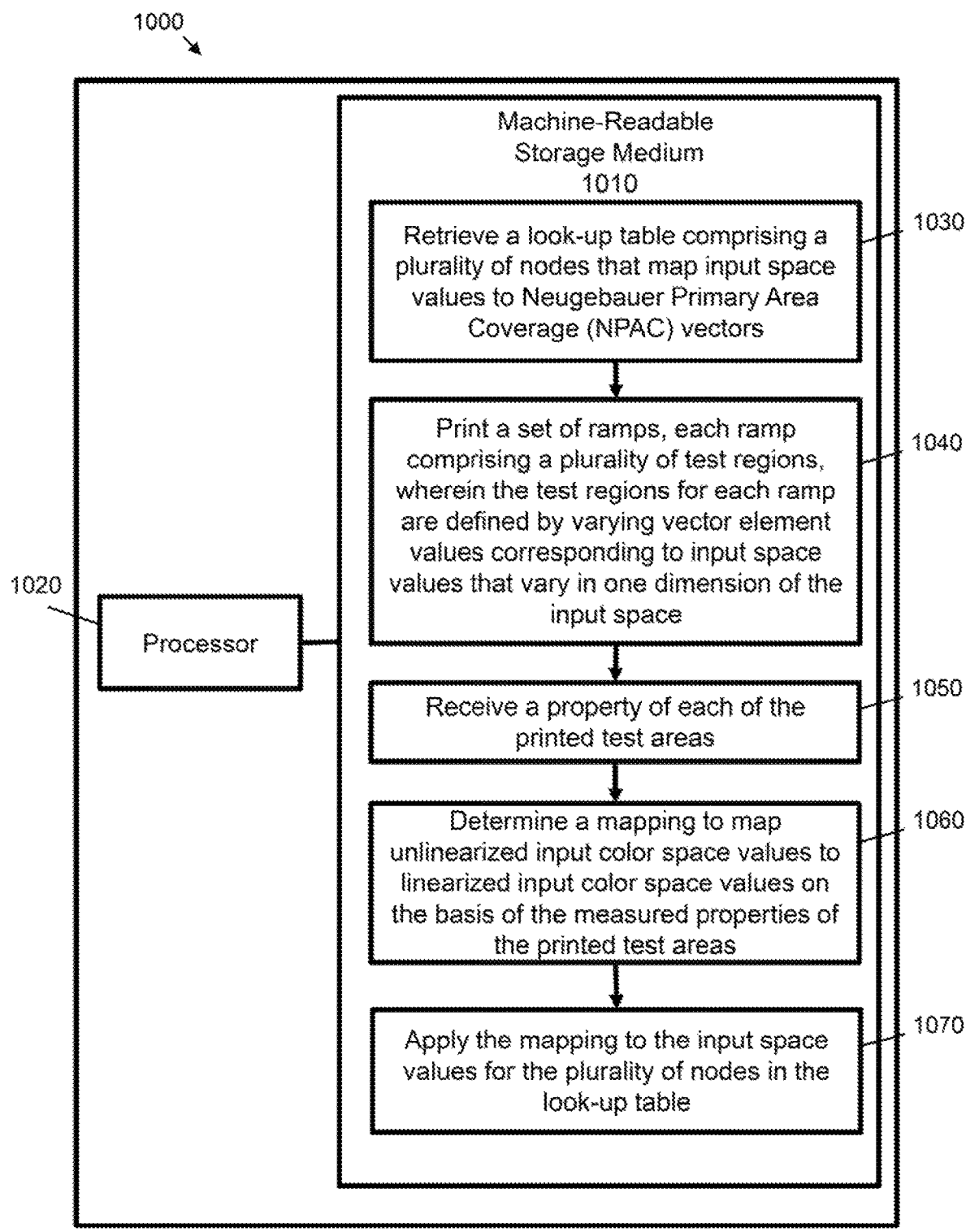
FIG. 10 is a schematic diagram showing a processing device according to an example.

As described above, certain methods and systems as described herein may be implemented by a processor that processes computer program code that is retrieved from a non-transitory storage medium. For example, the method 300 may be implemented by computer program code that is implemented by a computing device, including a processor of a computing system embedded in a printing device. In this context, FIG. 10 shows an example of a processing device 1000 comprising a machine-readable storage medium 1010 coupled to a processor 1020. In certain case the processing device 1000 may comprise a stand-alone computing device, such as a desktop computer or server communicatively coupled to an imaging device; in other cases the processing device 1000 may comprise part of a printing device or the like. The machine-readable medium 1010 can be any medium that can contain, store, or maintain programs and data for use by or in connection with an instruction execution system. Machine-readable media can comprise any one of many physical media such as, for example, electronic, magnetic, optical, electromagnetic, or semiconductor media. More specific examples of suitable machine-readable media include, but are not limited to, a hard drive, a random access memory (RAM), a read-only memory (ROM), an erasable programmable read-only memory, or a portable disc. In FIG. 10, the machine-readable storage medium comprises program code to implement the methods described above.

At block 1030, a look-up table comprising a plurality of nodes that map input space values to Neugebauer Primary Area Coverage (NPAC) vectors is retrieved. For example, the indication may be retrieved from the memory 120.

In certain examples, a first print operation is effected to produce the first set of color ramps for a set of available Neugebauer Primaries, each color ramp comprising a plurality of test areas, each test area being printed based a different NPac vector, wherein the test areas for each ramp are defined by monotonically-varying vector element values for a single corresponding non-blank Neugebauer Primary. A test area is a portion of substrate where printing is directed based on an NPac vector. It may be any shape or size.

At block 1040, a set of ramps is printed. Each ramp comprises a plurality of test areas, wherein the test areas for each ramp are defined by varying vector element values corresponding to input space values that vary in one dimension of the input space.

At block 1050, a property of each of the printed test areas is received. For example, the property may be received at the measurement interface 140.

At block 1060, a mapping to map unlinearized input color space values to linearized input color space values is determined on the basis of the measured properties of the printed test areas.

At block 1070, the mapping is applied to the input space values for the plurality of nodes in the look-up table.

The preceding description has been presented to illustrate and describe examples of the principles described. This description is not intended to be exhaustive or to limit these principles to any precise form disclosed. Many modifications and variations are possible in light of the above teaching. It is to be understood that any feature described in relation to any one example may be used alone, or in combination with other features described, and may also be used in combination with any features of any other of the examples, or any combination of any other of the examples.

What is claimed is:

1. A method of linearizing print outputs for a printing system, the method comprising:
    retrieving a look-up table comprising a plurality of nodes that map input color space values to Neugebauer Primary Area Coverage vectors;
    printing, with the printing system, a set of ramps, each ramp comprising a plurality of test areas, wherein the test areas for each ramp are defined by varying vector element values corresponding to input color space values that vary in a dimension of the input space;
    measuring a property of each of the printed test areas;
    determining a linearization function on the basis of the measured properties of the printed test areas, the linearization function being determined so as to linearize the property for print outputs of the printing system; and
    applying the linearization function to the input color space values for the plurality of nodes in the look-up table.

2. The method of claim 1, comprising measuring lightness of each of the printed test areas.

3. The method of claim 2, comprising:
    determining a range of lightness values for each of the test areas in a given ramp;
    dividing the range of lightness values into a plurality of intervals;
    interpolating regular lightness values in the input color space to generate a new set of input color space values.

4. The method of claim 3, wherein the new set of input color space values result in uniformly varying lightness values when printed.

5. The method of claim 1, comprising measuring a color difference with respect a white level for each of the printed test areas.

6. The method of claim 1, comprising determining a linearization function for each color channel of the input color space.

7. The method of claim 6, comprising determining an average linearization function for each color channel of the input color space.

8. The method of claim 7, comprising determining an average linearization function over all channels of the input color space.

9. The method of claim 8, comprising interpolating between measured data points of the average linearization function for each color channel of the input color space and/or the average linearization over all channels of the input color space.

10. The method of claim 9, comprising interpolating between measured data points using a piece-wise cubic interpolation, a square-root interpolation, or a piece-wise linear interpolation.

11. The method of claim 1, comprising:
    applying an inverse linearization function to a linearized look-up table to generate a delinearized look-up table;
    adding nodes to the delinearized look-up table to generate an augmented look-up table; and
    applying the linearization function to the augmented look-up table.

12. A printing system comprising:
    a printing device to print a plurality of colorants onto a print substrate;
    a memory comprising a look-up table, the look up table comprising a plurality of nodes that map input color space values to Neugebauer Primary Area Coverage vectors;
    a print controller to print a set of ramps, each ramp comprising a plurality of test areas, wherein the test areas for each ramp are defined by varying vector element values corresponding to input color space values that vary in a dimension of the input space; and
    a measurement interface to receive an indication of a measured property of each of the printed test areas;
    wherein the print controller is configured to:
        determine a linearization function on the basis of the measured properties of the printed test areas; and
        apply the linearization function to the input color space values for the plurality of nodes in the look-up table.

13. The printing system of claim 12, wherein the input color space is an RGB color space or a CMYK color space.

14. The printing system of claim 12, wherein the printing device is a two-dimensional printer or a three-dimensional printer.

15. A non-transitory machine-readable storage medium storing instructions that, when executed by a processor in a printing device, cause the processor to:
    retrieve a look-up table comprising a plurality of nodes that map input color space values to Neugebauer Primary Area Coverage vectors;
    print, with the printing system, a set of ramps, each ramp comprising a plurality of test areas, wherein the test areas for each ramp are defined by varying vector element values corresponding to input color space values that vary in one dimension of the input color space;
    receive a property of each of the printed test areas;
    determine a mapping to map unlinearized input color space values to linearized input color space values on the basis of the measured properties of the printed test areas; and
    apply the mapping to the input color space values for the plurality of nodes in the look-up table.

* * * * *